(12) United States Patent
Chinthekindi et al.

(10) Patent No.: US 11,468,012 B2
(45) Date of Patent: Oct. 11, 2022

(54) GARBAGE COLLECTION ASSISTED DEDUPLICATION IN A LOG STRUCTURED FILE SYSTEM

(71) Applicant: EMC IP Holding Company LLC, Hopkinton, MA (US)

(72) Inventors: Ramprasad Chinthekindi, San Jose, CA (US); Abhinav Duggal, Jersey City, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 204 days.

(21) Appl. No.: 16/805,434

(22) Filed: Feb. 28, 2020

(65) Prior Publication Data

US 2021/0271644 A1 Sep. 2, 2021

(51) Int. Cl.
*G06F 16/174* (2019.01)
*G06F 11/14* (2006.01)
*G06F 12/02* (2006.01)
*G06F 16/13* (2019.01)

(52) U.S. Cl.
CPC ...... *G06F 16/1748* (2019.01); *G06F 11/1453* (2013.01); *G06F 12/0253* (2013.01); *G06F 16/137* (2019.01); *G06F 2201/805* (2013.01); *G06F 2212/1044* (2013.01)

(58) Field of Classification Search
CPC ............... G06F 16/1748; G06F 16/137; G06F 11/1453; G06F 12/0253; G06F 2201/805; G06F 2212/1044
See application file for complete search history.

(56) References Cited

U.S. PATENT DOCUMENTS

| 2009/0019219 | A1* | 1/2009 | Magklis | G06F 12/084 711/105 |
| 2010/0205389 | A1* | 8/2010 | Kishi | G06F 11/1453 711/162 |
| 2015/0234710 | A1* | 8/2015 | Berrington | G06F 16/128 707/664 |
| 2019/0004714 | A1* | 1/2019 | Crawford | G06F 3/0649 |
| 2020/0272332 | A1* | 8/2020 | Jhan | G06F 3/0679 |

OTHER PUBLICATIONS

Fred Douglass, Abhinav Duggal, Philip Shilane, Tony Wong, The Logic of Physical Garbage Collection in Deduplicating Storage, Feb. 27, 2017-Mar. 2, 2017, Usenix, https://www.usenix.org/system/files/conference/fast17/fast17-douglis.pdf (Year: 2017).*

* cited by examiner

*Primary Examiner* — Allen S Lin
(74) *Attorney, Agent, or Firm* — Staniford Tomita LLP (57) ABSTRACT

A garbage collection assisted deduplication process determines whether or not data segments should be deduplicated or not based on the liveness of segment data in a region, and the number of segments subject to deduplication in the region. Ingested data is divided into a plurality of segments, and a fingerprint is calculated for each segment. An index table entry maps a fingerprint to a region and container ID, and a perfect hash vector is setup for this mapping. A percentage of live segments in the region relative to a liveness threshold is determined, as is a number of segments in the region subject to deduplication relative to a deduplication threshold. If a region is sufficiently live, deduplication is performed, but if the region is dead, deduplication is not performed. For a live region, if the number of deduplicated segments is too low, deduplication is not performed.

12 Claims, 8 Drawing Sheets

GARBAGE COLLECTION ASSISTED DEDUPLICATION IN A LOG STRUCTURED FILE SYSTEM

TECHNICAL FIELD

This invention relates generally to deduplication storage systems, and more particularly to using garbage collection assisted deduplication in a log structured file system.

BACKGROUND OF THE INVENTION

In log structured file systems, data is written sequentially to the head of a log for a better write throughput. The data writes in a log structured file system never overwrite an existing block. The new version of the file data is written to a new block and causes the data in the old blocks of the file to be partially or fully dead. To reclaim such dead space from the system, garbage collection (GC) processes are used to free up space for other data. The garbage collection process reads an old block, copies the live data from it to a new block, and deletes the old block.

In a log structured file system with deduplication capability, the writes to the file system are deduplicated and only unique or new data is written to the system. As is known, data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data.

The DellEMC Data Domain is an example of a log structured deduplication file system. As data is ingested to the Data Domain file system (DDFS), the data is segmented into segments (or chunks) and hash fingerprints are calculated for these data segments. These fingerprints are then looked up in the in-memory fingerprint cache or on-disk fingerprint index table for deduplication. Only those segments which cannot be deduplicated are grouped together in a region and a bunch of such regions are grouped and written to a block or container on disk and index is updated with the fingerprints corresponding to these new chunks being written. The deduplication engine comprises an in-memory fingerprint cache and an on-disk fingerprint table that is used to deduplicate incoming data with existing data segments in the system.

In present systems, the deduplication engine and garbage collection process do not intersect or interact with each other. This poses certain several significant challenges. First, the file system can deduplicate and revive any segment from a data block, without taking into account various factors, like how dead is the block, whether reviving a segment causes fragmentation in the data block, and so on. Garbage collection processes free space in units of data blocks or containers. Each time a dead data block is revived, the garbage collection process needs to read that block, copy live data (segments) to a new block, and delete the old block, instead of simply deleting a dead block had deduplication of data from that block been prevented. Second, the region level cleaning cannot free a region if it has even a single live data segment in it. If an ingest deduplicates a single data segment from a completely dead region, the garbage collection process cannot free such regions due to the fragmentation caused by deduplication. This causes inefficient cleaning. Third, the deduplication of a fingerprint without the context of temporal locality of neighboring fingerprints of the ingested file can cause file data fragmentation across many data blocks, thus impacting the read/restore performance of the file.

What is needed, therefore, is a garbage collection assisted deduplication method to control deduplication, balance duplicate segments and reduce fragmentation to improve cleaning speed, cleaning efficiency, cleaning cost and improve the read/restore performance.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve data processing and storage in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
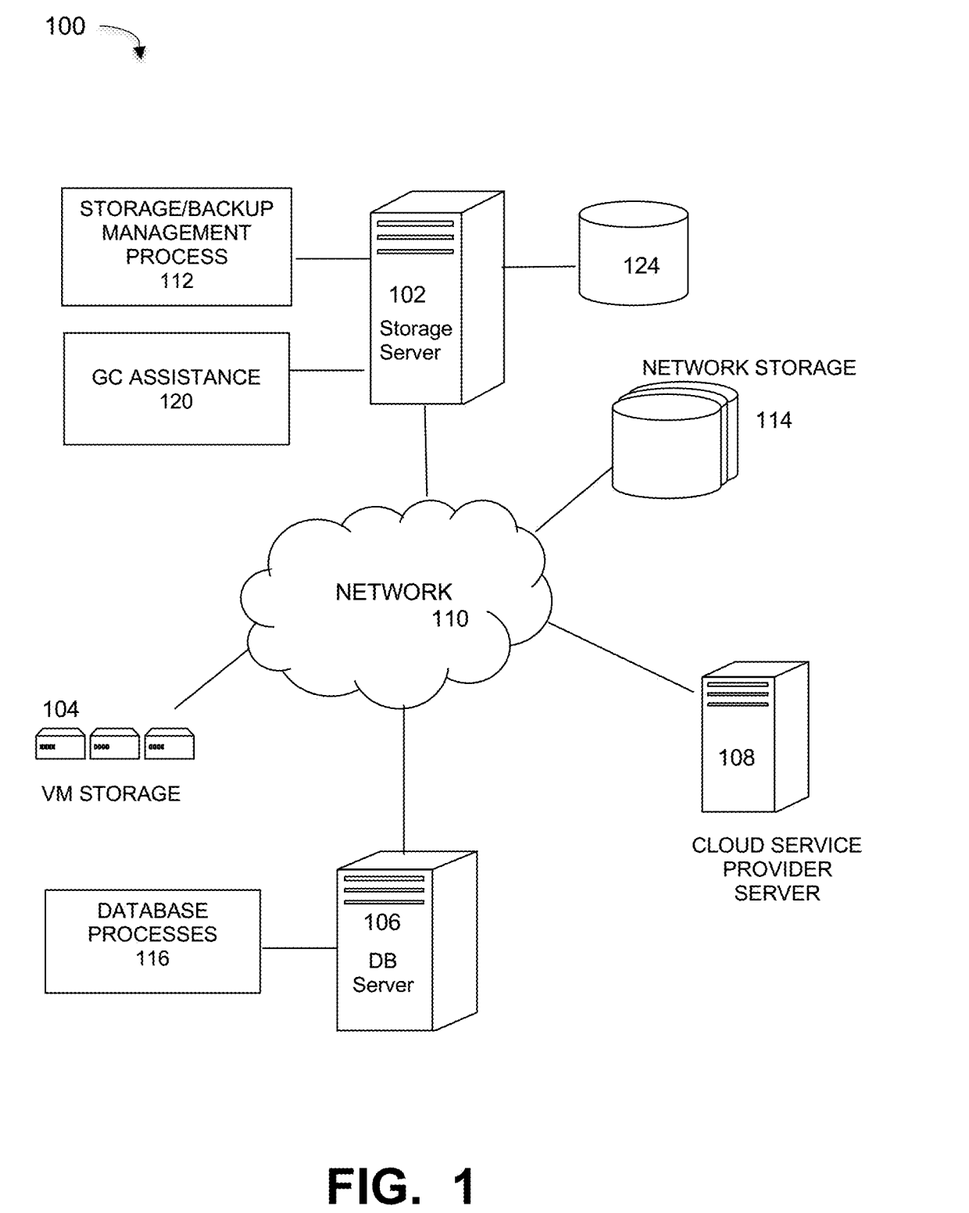
FIG. 1 is a diagram of a deduplication backup network implementing garbage collection for log structured file processing, under some embodiments.

Embodiments are described for a method to provide garbage collection assisted deduplication in a log structured file system. FIG. 1 illustrates a computer network system that implements one or more embodiments of a deduplication backup system implementing a GC assisted process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 106, in the network environment. The data sourced by the data source may be any appropriate data, such as database data that is part of a database management system, and the data may reside on one or more hard drives for the database(s) in a variety of formats. Thus, data source 106 may be a database server executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP) 108. The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays.

In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible. In general, Data Domain is a purpose-built backup appliance providing streaming deduplication that is able to ingest data at full network speeds, from multiple backup sources while providing storage efficiency. Present Data Domain systems are able to use tiered data storage technologies, such as very large multi-terabyte SATA drive trays, or SSD-enabled fast ingest trays. Data Domain has a logical extension to its file system and MTree organization which allows a data movement policy to be applied to aging backup content.

The Data Domain File System (DDFS) is an inline data deduplication file system. As data gets written to the file system, DDFS breaks it into variable sized segments and a group of segments are packed in a compression region. A number of compression regions are grouped together and written as a container to disk. DDFS calculates fingerprint signatures for each segment using a SHA1 (secure hash algorithm 1) algorithm. DDFS has an on-disk fingerprint index table that maps the fingerprint to the container-ID that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called a fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

Figure 2:
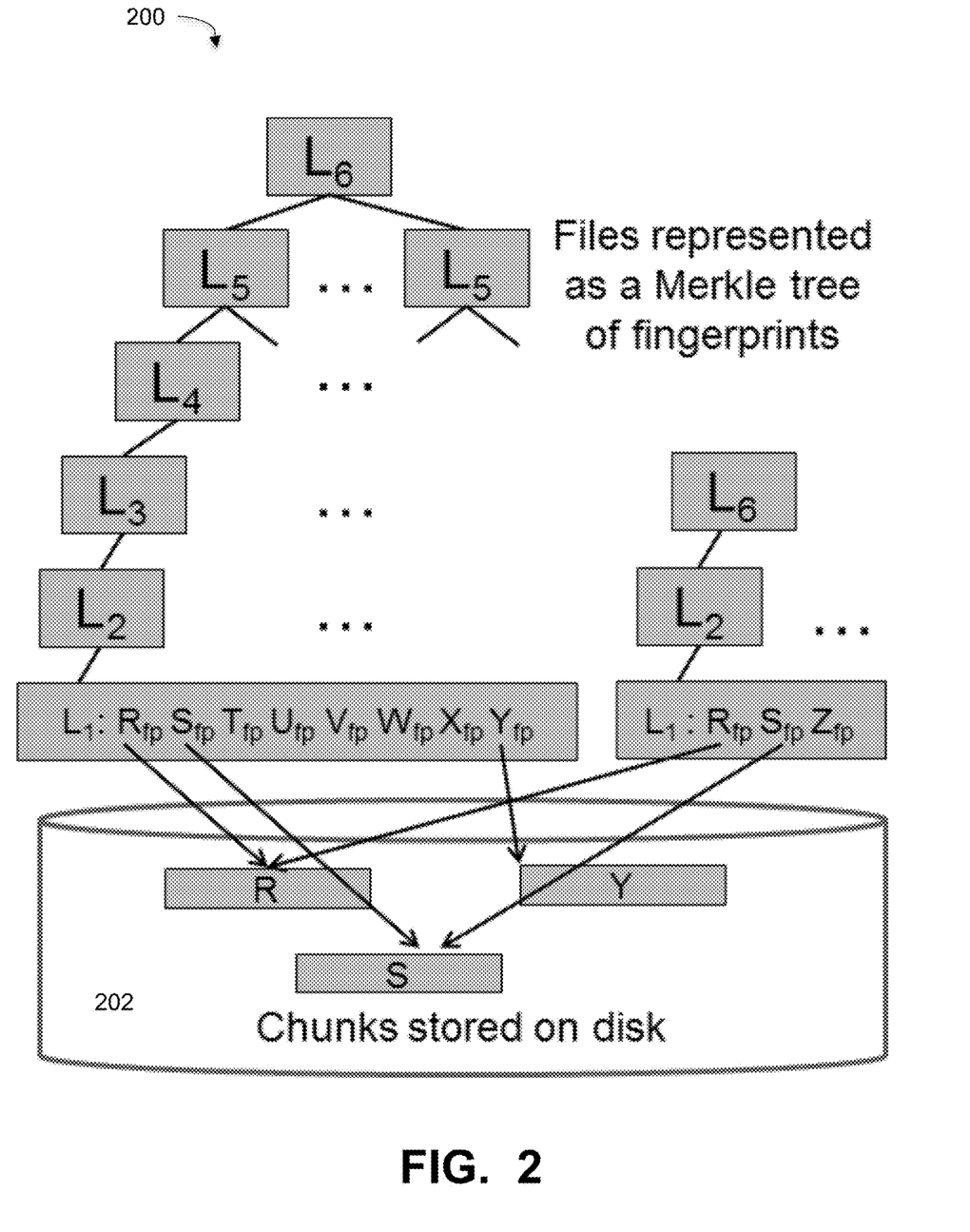
FIG. 2 illustrates an example Merkle tree representation of files in a deduplication backup system, under some embodiments.

FIG. 2 illustrates an example Merkle tree representation of files in a deduplication backup system, under some embodiments. As shown in FIG. 2, Merkle tree 200 comprises layers L0 to L6. The chunks directly written to disk 202 are referred to as $L_0$, meaning the lowest level of the tree. Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as $L_p$ chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, $L_p$ chunks are themselves stored on disk in containers, which include a relatively small (hundreds of KB) metadata section with a list of fingerprints for the chunks within the container. Thus, they may be read more quickly than the full container.

With reference to FIG. 2, the L0 segments represent user data and are the leaves of the tree. The L6 is the root of the segment tree. As stated above, segments from L1 to L6 are the metadata segments or LP segments and represent the metadata of a file associated with a file tree. An L1 segment is an array of L0 references. Similarly an L2 is an array of L1 references and so on. A segment is considered live if it can be referenced by any live content in the file system. The file system packs the segments into containers that are written to disk in a log-structured manner. Each container is structured into sections. The first section is the metadata section and the following sections are referred to as compression regions. In the metadata section there are all the references or fingerprints that identify the segments in the container. A container manager may be used that is responsible to maintain the log-structured container set and provide a mapping from container identifiers (CID) to block offset on disk. This mapping is entirely stored in memory. The garbage collection process of the file system is responsible for enumerating all live segments in the live content handles of the file system. In a physical garbage collection process, the enumeration algorithm carries out a breadth-first traversal of all the files in the file system.

Deduplication backup systems, such as the DellEMC Data Domain system use deduplication techniques as a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication.

To service an input/output (I/O) operation initiated from an external backup application, the Data Domain File System (DDFS) must initiate multiple internal I/O operations, such as to lookup LP segment fingerprints, look up indexes, read container metadata, and to read the actual data before servicing the I/O to the backup application. In addition to the external backup application workload there could be some internal file system maintenance operations, such as garbage collection, and so on, that are concurrently executed to keep the system at an optimal state. The I/O's that are initiated as part of backup application workload as well as the internal maintenance operations would be serviced from the same storage devices.

In an embodiment, system 100 implements a log structured file system in which data and metadata are written sequentially to a log that is implemented as a circular buffer. Log-structured file systems must reclaim free space from the tail of the circular buffer log to prevent the file system from becoming full when the head of the log wraps around to meet to the tail of the log. The tail can release space and move forward by skipping over data for which newer versions exist farther ahead in the log. If there are no newer versions, then the data is moved and appended to the head. This is performed by a garbage collector function, which may execute certain GC policies to remove file segments or blocks that are marked for deletion. Such policies can specify a periodic cleaning schedule during which the garbage collector runs a cleaning operation. The cleaning operation may include enumerating the files in the file system of the backup system to identify files for blocks marked for deletion. Since a garbage collection can consume a significant amount of resources, the garbage collection policies allow the user to specify the conditions (e.g., times) when garbage collection may be run. The GC process usually runs as a separate background job to scan all data segments in the file system to find out unreferenced data segments and remove them to release disk space. It also re-packs data into new objects in order to make data objects in similar size, since keeping all objects in as similar a size as possible generally helps performance, and prevents growing metadata due to storing very small objects.

As stated above, present garbage collection techniques for the cloud-tier in Data Domain system use object level or region level cleaning. This means that GC on the cloud-tier cannot free or delete a region if it has at least one dead segment. The cleaning becomes inefficient due to random segment revivals from almost dead regions, due to ingest data deduplication which revive the dead segments, thus causing region level fragmentation. Embodiments implement garbage collection processes with deduplication to reduce this fragmentation.

In an embodiment, the storage server 102, or other computer within system 100, executes a GC assisted deduplication backup process 120 as part of the backup management process 112. This process controls deduplication, balances duplicate segments and reduces fragmentation to improve cleaning speed, cleaning efficiency, cleaning cost and improve the read/restore performance of the backup system.

When data is ingested to the Data Domain system 100, the file system divides the data into segments and calculates the SHA1 fingerprint for each data segment. The file system maintains an on-disk fingerprint index table for the purpose of deduplication. Each entry in the index table is a fingerprint to <region, container-id>. When the first fingerprint is looked upon in the index, if it finds an entry in the table, it loads the container worth of fingerprints from the metadata section of the container to an in-memory fingerprint cache. This is done to take advantage of the stream informed segment layout (SISL) and avoid index lookup for every fingerprint. In the backup workload there is some change rate in a daily or weekly backup, so most of the current backup data is expected to deduplicate with the older generation of the same backup. In order to avoid excessive on-disk index lookups, the file system keeps a lookup horizon window, until which it avoids index lookups. For example, if the first fingerprint is a hit in the on-disk index table, a container worth of fingerprints are loaded in the fingerprint cache. Now, if the second fingerprint is a miss in the in-memory fingerprint cache, it does not go to the on-disk index lookup. Instead, the data segment is written to the disk, so the on-disk index lookup is skipped for the size of the lookup horizon window. Typically, the lookup window size is on the order of 1 MB, though embodiments are not so limited.

When the retention period of backup files expires, some data segments die and some are still alive, since the other existing files may be sharing the same data segments. Present deduplication methods do not consider the liveness of the regions. Also, they do not take into account how many data segments are getting revived from a given region in a container during deduplication. This causes fragmentation of file data across many regions/containers, which is also known as poor file locality. If the file data is fragmented across many containers, the read or restore involves increased on-disk index lookups and loading fingerprints of many containers into the fingerprint cache.

Process 120 of system 100 overcomes these shortcomings by making deduplication decisions based on 1) the region liveness, and 2) how many segments of a region are getting deduplicated. Embodiments use certain perfect hash functions to map each fingerprint to a unique bit position in an in-memory perfect hash vector.

Figure 3A:
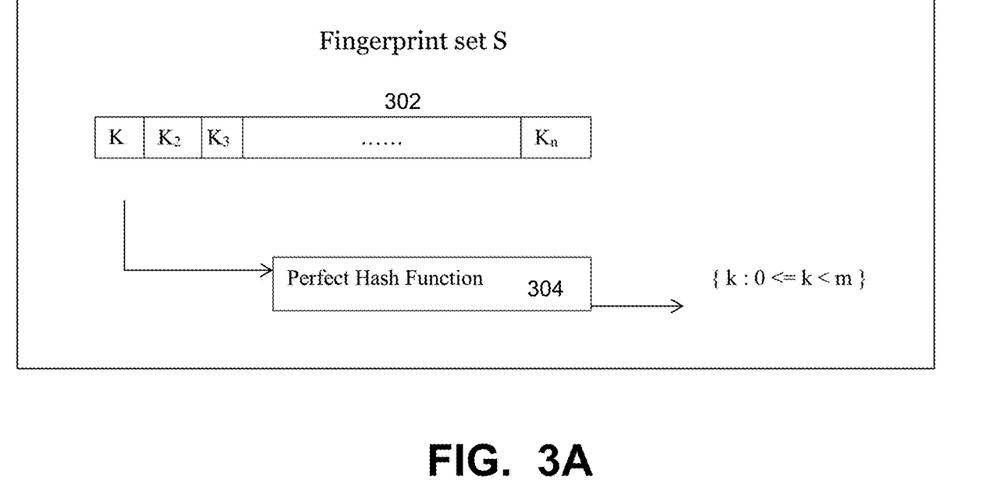
FIG. 3A illustrates a perfect hash function for a fingerprint set that can be used in conjunction with certain embodiments.

In general, a perfect hash function is a collision-free hash function that maps a set of keys of size n to a range of size m where m>n (m=1.43*n). For example, it only requires 2.8 bits per key in a present Data Domain implementation, and is thus is much more compact than the Bloom filter, which requires 6 bits per fingerprint. However, use of the perfect hash vector requires that the hash function should be pre-computed using the entire set of keys first and any key not in the initial set can cause a collision. FIG. 3A illustrates a perfect hash function 304 for a fingerprint set 302 that can be used in conjunction with certain embodiments. The perfect hash function phf( ) has the following representation:

$$\text{phf}(x) = (f(x) + a_{i(x)} h(x) + b_{i(x)}) \% m$$

$$i(x) = g(x) \% r$$

where f, g, h are uniform hash functions; r is the number of hash buckets in the perfect hash function and a, b are constants that depend on the bucket. The size of the function can be written as:

$$|PH_{vec}| = |PHF| + |\text{Bit vector}|$$

where |PHF| is the space required to store the per bucket constants.

Figure 3B:
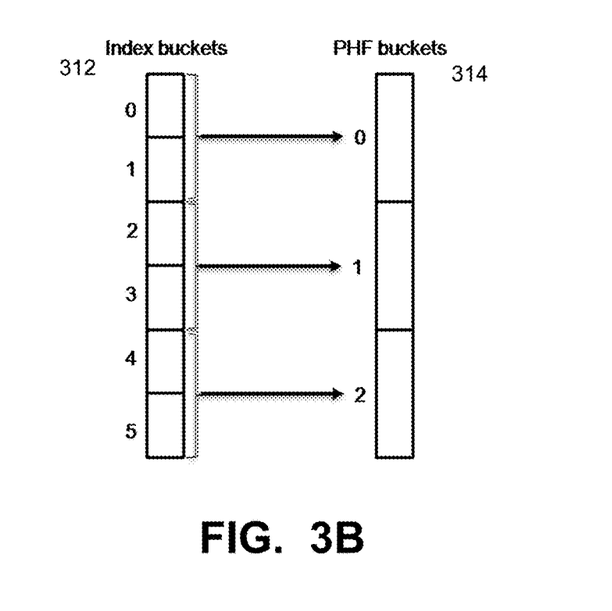
FIG. 3B illustrates a correlation of index buckets to perfect hash function (PHF) buckets, under an embodiment.

The index is further subdivided into multiple partitions such that all the fingerprints in each partition can fit in memory in order to build the perfect hash function for that subset of fingerprints. FIG. 3B illustrates a correlation of index buckets 312 to perfect hash function (PHF) buckets 314, under an embodiment. As shown in the simple example of FIG. 3B, index buckets 0 and 1 are put in PHF bucket 0, index buckets 2 and 3 are put in PHF bucket 1, and index buckets 4 and 5 are put in PHF bucket 2.

In an embodiment, the garbage collection assisted deduplication process 120 essentially determines whether or not data segments should be deduplicated or not based on the liveness of segment data in a region, and the number of segments subject to deduplication in the region. Instead of applying deduplication all the time, deduplication may be overridden in order to prevent fragmentation and increased disk lookups and fingerprint loading.

Figure 4:
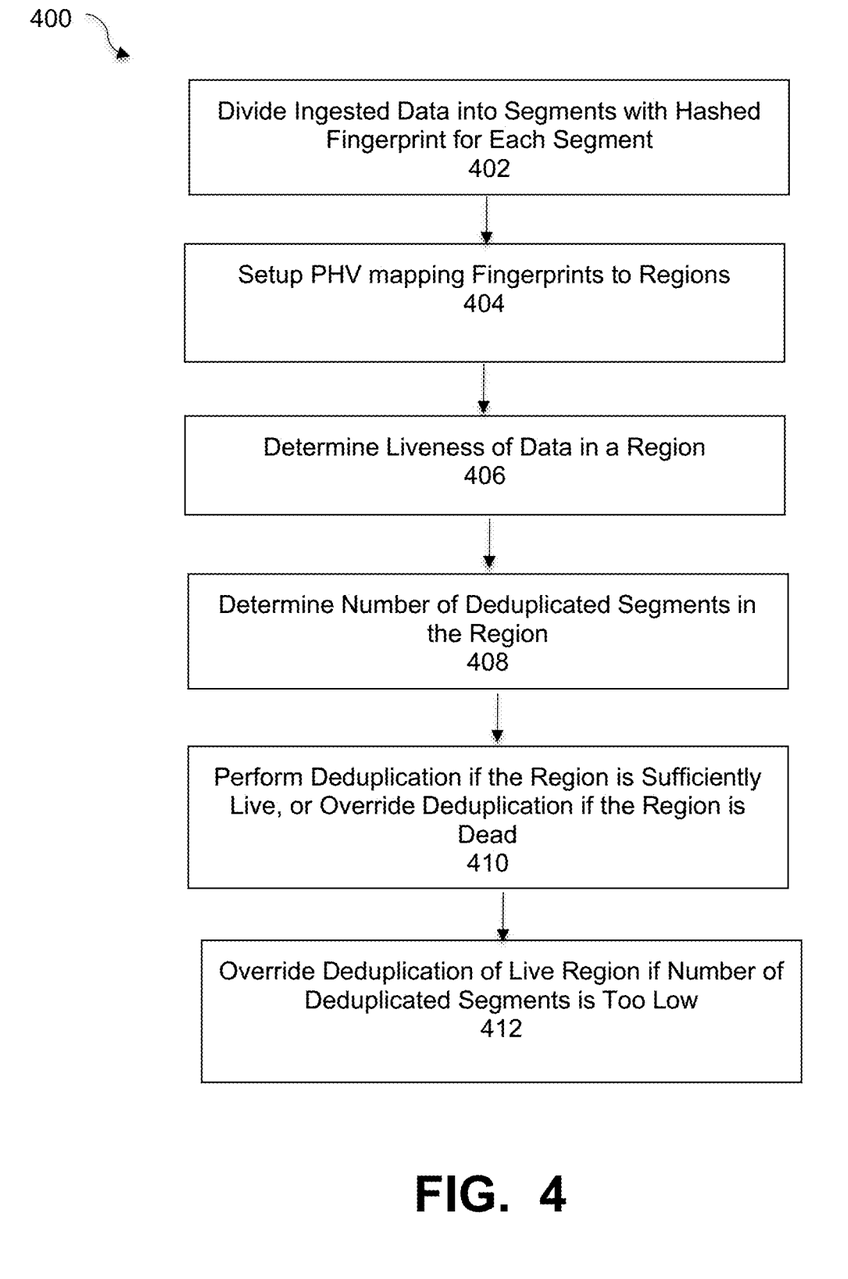
FIG. 4 is a flowchart that illustrates an overall process of performing GC assisted deduplication, under some embodiments.

FIG. 4 is a flowchart that illustrates an overall process of performing garbage collection assisted deduplication, under some embodiments. Process 400 of FIG. 4 begins by ingesting data to be stored in storage media using deduplication. The data is divided into a plurality of segments, and a hash fingerprint is calculated for each segment, 402. The process maintains an index table wherein each entry maps a fingerprint to a region and container identifier, and a perfect hash vector is setup for this mapping, 404. The process then determines, after in index lookup to the index table, a percentage of live segments in the region relative to a defined liveness threshold, 406. It then determines a number of segments in the region subject to deduplication relative to a defined deduplication threshold, 408. For the liveness of the region (step 406), the process performs deduplication if the region is sufficiently live, but overrides the deduplication if the region is dead, 410. This may cause some storage of duplicate data, but reduces excessive numbers of disk lookups and loading of fingerprints into the fingerprint cache. The liveness of a region is generally determined by calculating the number of live data segments in the region compared to a defined liveness threshold, which may be set as a percentage of live segments relative to all segments of a region, such as 10%, 20%, or any other appropriate level.

If a region is live, deduplication may be allowed or disallowed depending on other conditions. For example, the system may allow deduplication if the region is live and does not cause region fragmentation. However, if very few segments from ingest are deduplicated with this live region, its locality may get affected, in which case deduplication may be disallowed. Overall, there needs to be a balance between file locality due to deduplication and garbage collection efficiency due to region level fragmentation with deduplication. Thus, in step 412, a deduplication decision may be overridden if the number of deduplicated segments is too low, such as compared to a defined threshold, otherwise deduplication may be allowed. Again, overriding deduplication may cause some storage of duplicate data, but reduces data storage fragmentation and helps maintain better file locality. The defined deduplication threshold may also be set as a percentage of deduplicated segments relative to all segments of a region, such as 10%, 20%, or any other appropriate level.

In an embodiment, the liveness of a segment (step 406) may be determined by any appropriate method, such as marking each fingerprint as alive or dead, tallying the number of live segments and a number of dead segments in the region based on the fingerprint marking, subtracting the number of dead segments from the number of live segments to obtain a difference that determines the percentage of live segments, defining the region as dead if the difference is less than the defined liveness threshold, and defining the region as live if the difference is greater than or equal to the defined liveness threshold.

Thus, the process of FIG. 4 basically performs a conditional deduplication wherein, if a data region is dead, deduplication is overridden and not performed, but if a data region is live, deduplication may still be overridden if too few segments are to be deduplicated. Likewise, for a live region, deduplication may be allowed as mentioned above.

Figure 5:
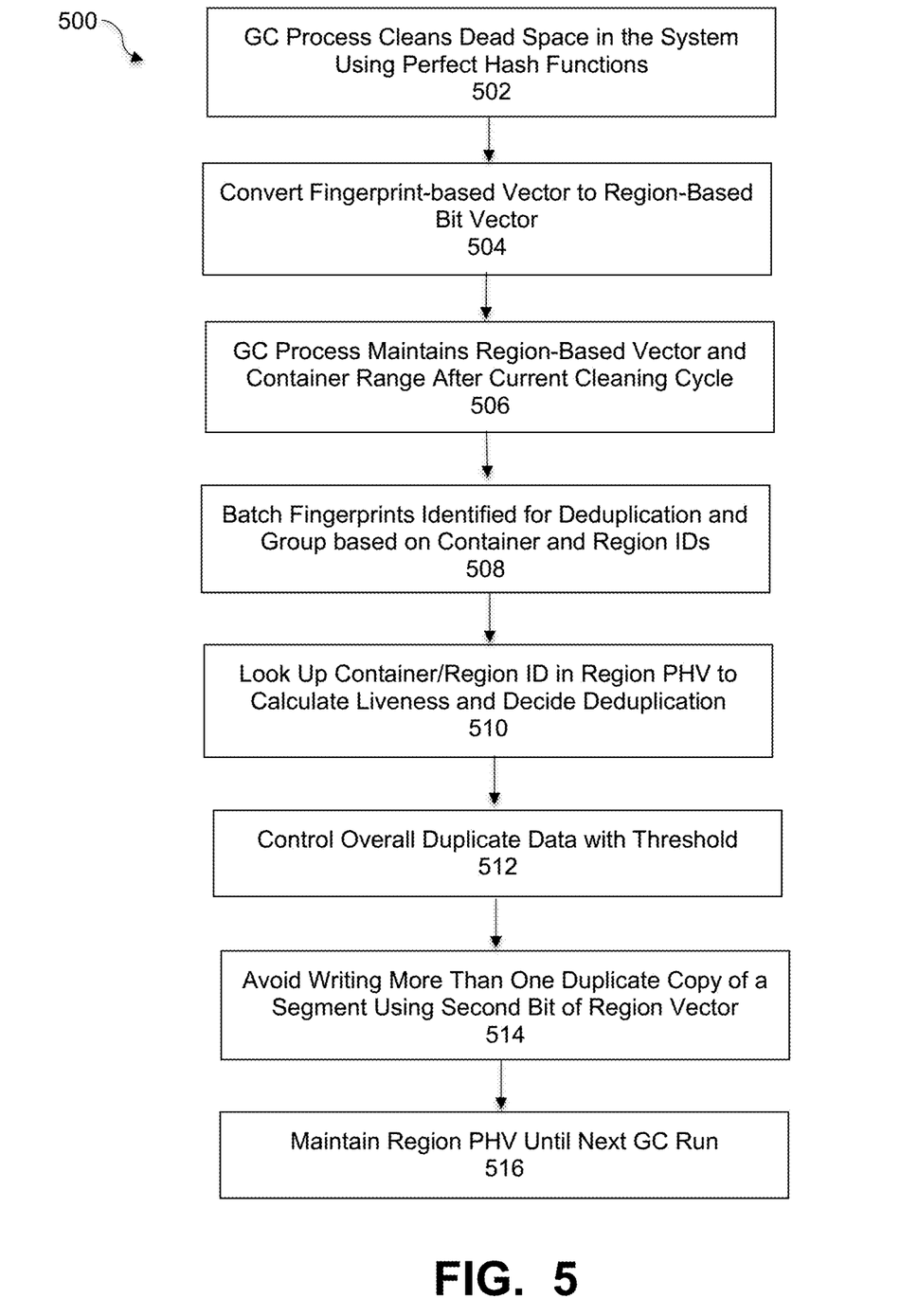
FIG. 5 is a flowchart illustrating a method of providing GC assisted deduplication by converting a perfect hash vector from fingerprint-based to container-id based, under some embodiments.

As shown in FIG. 4, a PHV is used to map the fingerprints to the regions (step 404). In an embodiment, process 120 converts a fingerprint-based perfect hash vector to a container-id, and region number based perfect hash vector to help implement GC assisted deduplication. FIG. 5 is a flowchart illustrating a method of providing GC assisted deduplication by converting a perfect hash vector from fingerprint-based to container-id based, under some embodiments. Process 500 of FIG. 5 begins with the GC process using a mark and sweep algorithm to clean dead space in the system, step 502. The GC builds perfect hash functions to map each fingerprint in the system to a unique bit position in an in-memory perfect hash bit vector (PHV). In the mark phase, it enumerates the whole system and marks a bit in the perfect hash bit vector for each live segment being enumerated. This perfect hash vector is fingerprint based, where each bit represents whether an individual segment is alive or dead. In order to maintain the region liveness, the fingerprint-based bit vector is converted to a region based bit vector, step 504. Perfect hash functions are built using the <region_id, container_id> as keys and each region of a container is mapped to a unique position in the vector. The payload of each region in the vector represents the liveness information of each segment within that region. Two bits per segment are maintained in the vector. The first bit tells whether a segment is alive or dead, i.e., bit value 0 represents the segment is dead and 1 represents it is alive. The second bit is set to 1 if the ingest writes a duplicate copy of this segment. The second bit is used to avoid writing more than one duplicate copy of a segment, when the deduplication decision is overridden.

Figure 6:
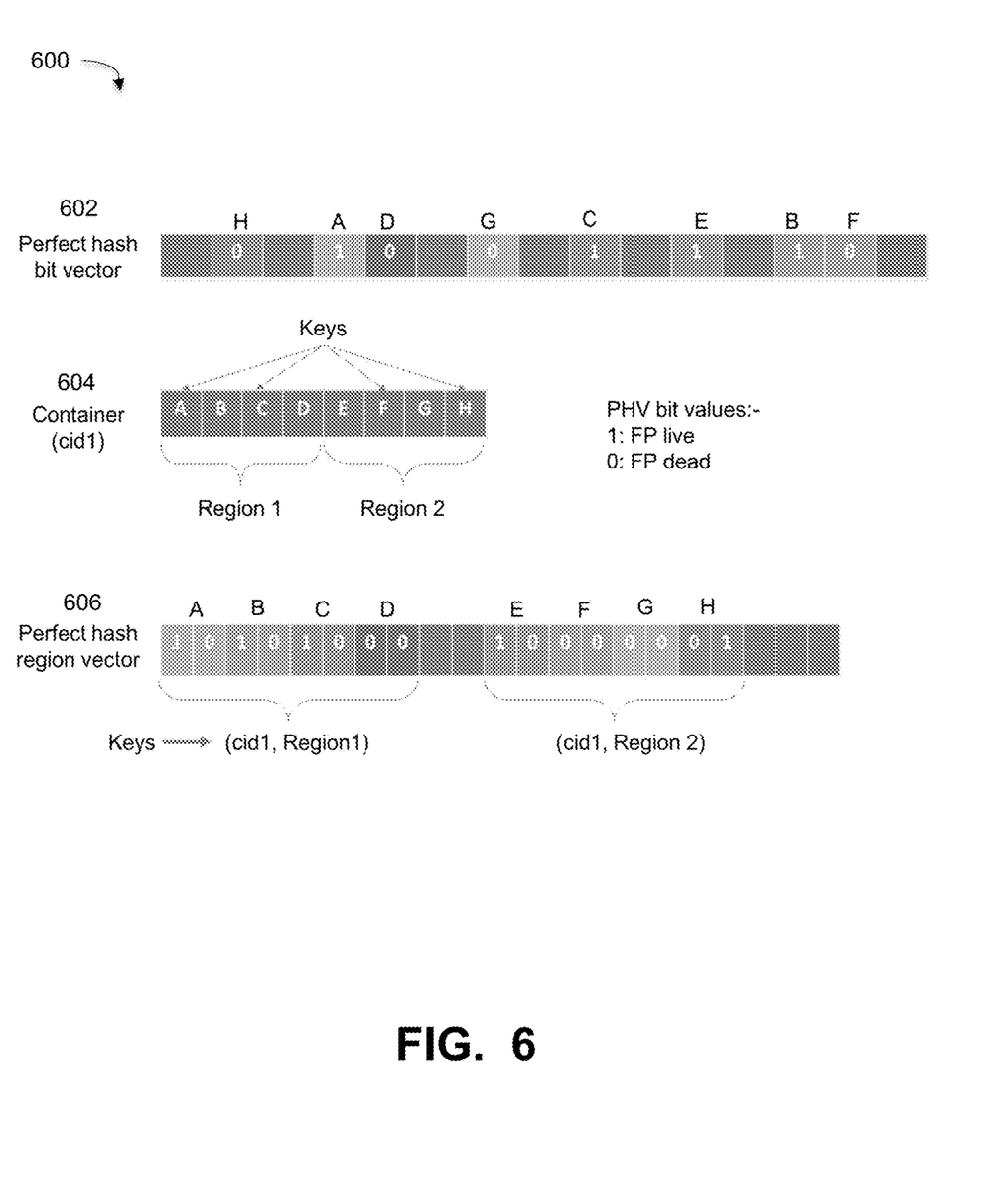
FIG. 6 is a diagram illustrating the conversion of a perfect hash vector from fingerprint-based to container-id based, under some embodiments.

FIG. 6 shows an example of how a fingerprint based PHV vector is converted to (cid, region_id) based PHV vector, under some embodiments. As shown in diagram 600, a perfect hash vector 602 has certain binary value entries in bit locations denoted H, A, D, G, C, E, B, and F. The binary PHV bit values are 1 for a live fingerprint and 0 for a dead fingerprint. Thus, for the example shown in FIG. 6, fingerprints H, D, G, and F are dead, while fingerprints A, C, E, and B are live. A container_id 604 maps the fingerprints A-H to one of two regions, Region 1 and Region 2. These keys are applied to the perfect hash bit vector 602 to generate a perfect has region vector 606, which contains 2 bits per fingerprint, and which separates the fingerprints into regions within the vector.

The first bit of each fingerprint is the liveness bit. It is set to 1 if this fingerprint is referred to by any file in the namespace. If the bit is 0, it means that segment corresponding it this fingerprint is dead. So, garbage collection can reclaim this segment. The second bit is used to control the deduplication decision. If the region is almost dead and if deduplication is trying to revive a dead segment from this dead region, the process overrides this decision and asks ingest to write a duplicate copy of this data to improve locality and avoid fragmentation. So, in this case, the second bit is set to indicate that the system wrote a duplicate. To avoid writing too many duplicates, in the next deduplication decision, the process looks at this second bit and allows ingest to deduplicate with this data regardless of the liveness of region (whether the region is live or dead), to control the overall duplicates.

With reference back to FIG. 5, in step 506, the garbage collection process continues to maintain this region-based vector (e.g., 606) along with the container range, even after the current cleaning cycle. Any ingest deduplication within this container range will come to the garbage collection process for the final deduplication decision. For incoming ingested data, the process gets a batch of fingerprints of data segments that are identified for deduplication, and groups the fingerprints based on <container_id, region_id>, step 508. In step 510, the process looks up the <container_id, region_id> in the in-memory perfect hash region vector and calculates the region liveness % and makes the deduplication decision based on certain conditions.

Figure 7:
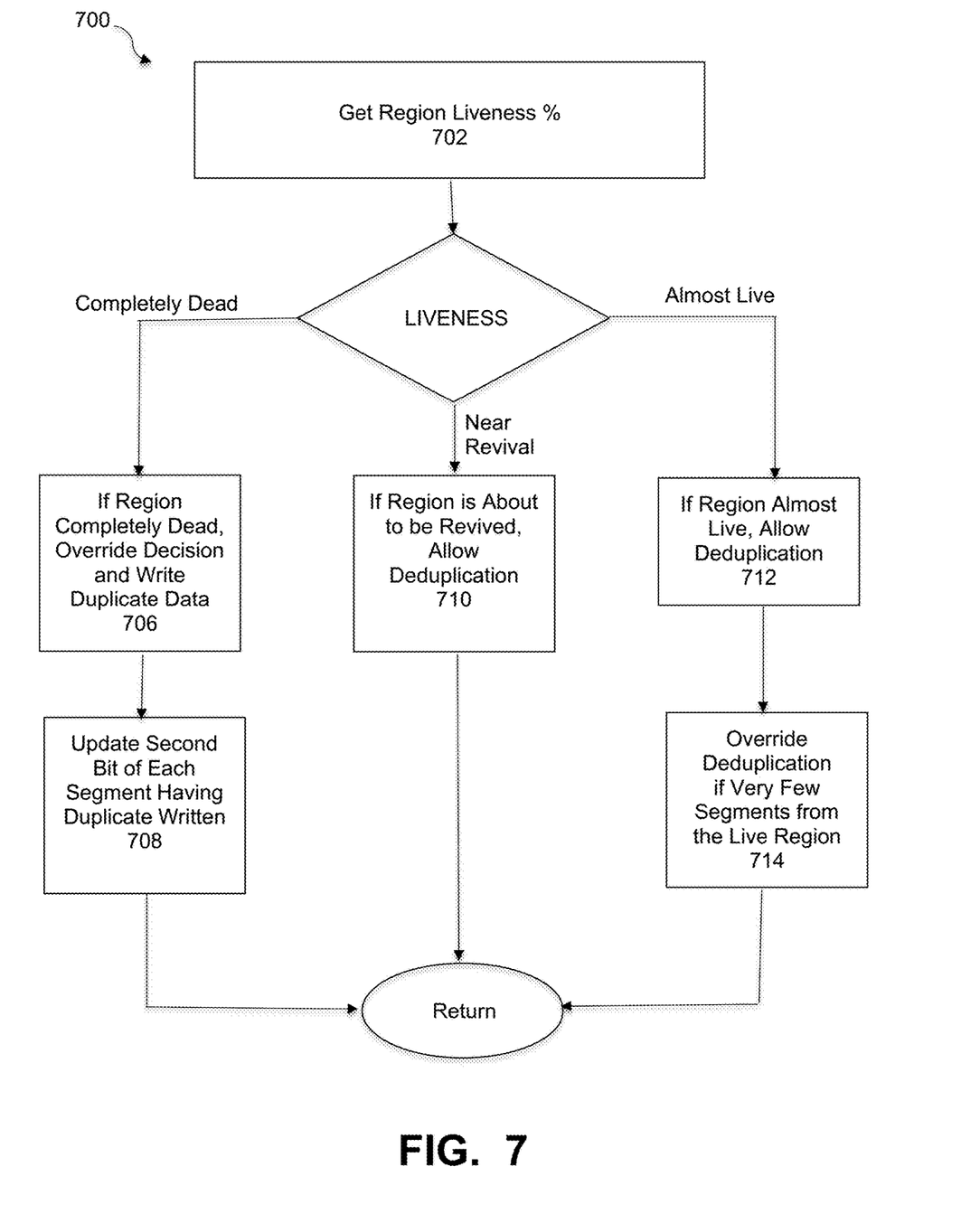
FIG. 7 is a flowchart illustrating a conditional deduplication decision process, under some embodiments.

The conditional deduplication decision process is illustrated in flowchart 700 of FIG. 7. As shown in FIG. 7, the region liveness from step 510 of FIG. 5 is used to make the deduplication decision, step 702. As shown in step 706, if the region is completely dead and deduplication is about to revive very few data segments from this region, the process overrides the decision and writes duplicate data. It then updates the second bit of each segment, for which it is writing a duplicate, step 708. As shown in step 710, if the deduplication is about to the revive the entire region or most of the segments of the region, then allow the deduplication. As shown in step 712, if the container or region is almost live the process will allow deduplication, instead of writing duplicates. However, the system can choose to write duplicates (override the deduplication decision) if the deduplication is happening for very few segments from a live region, 714. The threshold for defining the very few segments can be set by a threshold number, such that deduplication is allowed if the number of deduplicated segments from the live region is above the defined threshold, and deduplication is not allowed if the number of deduplicated segments is below this defined threshold.

For the example of FIG. 6, Region 1 has three live segments (A, B, C) and one dead segment (D). The deduplication of any fingerprint from this region is allowed. In contrast, Region 2 has only one live segment (E). If a deduplication request comes for just one segment, e.g. H, the process would write a duplicate and mark the second bit for controlling the duplicates. After the deduplication decision is made in process 700, it returns to step 512 of process 500.

With reference back to FIG. 5, process 500 proceeds with step 512 which controls the overall duplicate data with a threshold. If the duplicate data exceeds the threshold, do not override the deduplication decision and go ahead with deduplication. This avoids writing too much duplicate data and avoids the file system space full condition. In step 514, the process uses the second bit of the region vector to avoid writing more than one duplicate copy of a segment, using. This bit is set the first time the duplicate copy of this segment is written. The perfect hash region based vector is maintained until the next garbage collection run, step 516. During the next garbage collection run, the region based vector is rebuilt to represent the region liveness of the whole system.

The garbage collection assisted deduplication process 500 provides several benefits over existing systems, such as improving the locality of the latest backup files, providing an efficient region-level garbage collector, and reducing cloud cost during garbage collection, among other benefits and advantages.

With respect to improving locality, process 500 avoids deduplicating a single segment or few data segments from a region or a container. Writing a duplicate copy makes the locality of the latest backup file better, which improves the read/restore performance of latest backup files. With respect to efficient garbage collection, process 500 prevents revival of a region due to deduplication of few data segments from a region. The garbage collection process also removes duplicates from the system. For example, if a region has only one live segment, by forcing the subsequent ingest to write a duplicate copy of this live segment to a new region, instead of deduplication, it will make the older region die faster, thus solving region fragmentation. As the older regions die faster, garbage collection can efficiently clean these regions.

With respect to reducing cloud costs, for objects on the cloud, as backup files are expired, it results in some dead data in the objects. For garbage collection on a cloud-tier, it needs to read an object from cloud object store over the network to on-premise file system, prepare a new object by copy forwarding live segments from old object and write back the new object to cloud. There is an egress cost associated with reading the data over the network out of cloud region to on-premise storage. With controlling deduplication and writing duplicates, the whole region becomes dead. So, garbage collection on the cloud-tier avoids reading the dead objects. It also provides efficient garbage collection of Instance Access and Instant Restore (IA/IR) frequent backups. For the IA/IR workload, the frequent backup of data into deduplication system generates lot of churn (dead data) and puts pressure on the garbage collection process to clean dead data. By controlling deduplication, the regions die faster for such workloads. Garbage collection will be more efficient to clean dead space and support workloads with high churn.

Embodiments thus provide garbage collection assisted deduplication to improve garbage collection performance by preventing deduplication of almost dead regions and avoiding disk reads during cleaning. They also provide efficient region level cleaning with garbage collection assisted deduplication, causing the regions to die faster, by skipping deduplication of almost dead regions. It makes garbage collection cost efficient for cloud-tier cleaning with garbage collection assisted deduplication, and provides garbage collection assisted deduplication to improve file read/restore performance.

System Implementation

With respect to the flowcharts of FIGS. 5 and 7, the functional steps may be performed by hardware processing components provided by one or more of the servers or resources of system 100 of FIG. 1. Such components may be provided or embodied as part of backup process/component 112 and corrupt file repair process/component 120. Such components may be embodied as one or more (first, second, third, etc.) hardware, processing, or programmed circuits configured to execute program instructions to perform a certain task, interfaces to transmit and receive data within a computer (node) or between computers (nodes), co-processors to perform subroutines or sub-tasks, and other similar components.

Embodiments of the processes and techniques described above can be implemented on any appropriate backup system operating environment or file system, or network server system. Such embodiments may include other or alternative data structures or definitions as needed or appropriate.

Figure 8:
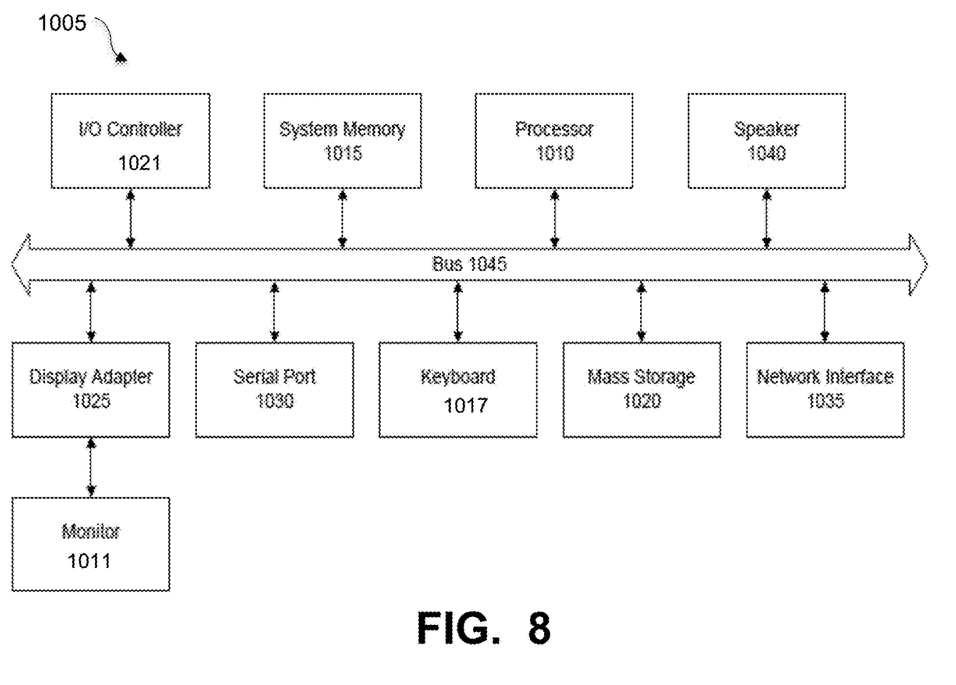
FIG. 8 is a system block diagram of a computer system used to execute one or more software components of garbage collection assisted deduplication backup system, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 8 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of performing deduplicated backups in a computer network comprising:

performing a garbage collection process of a file system to map each data segment fingerprint to a unique bit position in a perfect hash vector (PHV), wherein each bit represents whether or not a segment is live or dead based on its binary value of 0 or 1 liveness, wherein liveness comprises a referencing of the segment by any current content of the file system;

converting the fingerprint-based PHV to a region-based vector using region identifiers for each region of a plurality of regions, and container identifiers of the segments as keys;

defining two bits per segment in the region-based vector, wherein a first bit is set to the a binary live/dead live or dead value, and a second bit indicates whether or not an ingest writes a duplicate of the segment indicating a deduplication decision of the segment;

grouping ingested data into one or more regions of the plurality of regions based on the container identifier and region identifier;

first calculating a liveness of each region to classify a corresponding region as live versus dead by determining that a percentage of live segments in the corresponding region is greater than a defined liveness threshold;

allowing a programmed deduplication operation to be performed to prevent duplicate data segments being stored, and setting the first bit to the live state binary value;

second calculating a number of deduplicated segments of each region to determine that a number of segments in the corresponding region subject to the deduplication operation is less than a defined deduplication threshold; and overriding the allowing step to prevent the deduplication operation being performed to thereby allow duplicate data segments to be stored, and setting the second bit to a no deduplication state.

2. The method of claim 1 wherein the first calculating step comprises:

tallying a number of live segments and a number of dead segments in the corresponding region based on the fingerprint marking;

subtracting the number of dead segments from the number of live segments to obtain a difference that determines the percentage of live segments;

defining the corresponding region as dead if the difference is less than the defined liveness threshold; and defining the corresponding region as sufficiently live if the difference is greater than or equal to the defined liveness threshold.

3. The method of claim 1 further comprising maintaining the PHV between the garbage collection process and a subsequent garbage collection process to represent region liveness of the computer network.

4. The method of claim 3 wherein the computer network comprises at least part of a deduplication backup system including a data storage server running a Data Domain file system (DDFS).

5. The method of claim 4 wherein the file system implements a log structured file system in which data and metadata are written sequentially to a log that is implemented as a circular buffer.

6. A computer program product, comprising a non-transitory computer-readable medium having a computer-readable program code embodied therein, the computer-readable program code adapted to be executed by one or more processors to implement a garbage collection assisted deduplication backup process in a computer network by which, when executed by a processor, cause the processor to perform a method to implement a garbage collection assisted deduplication backup process in a computer network, comprising:

dividing data to be stored in network storage media into a plurality of segments;

calculating a hash fingerprint for each segment of the plurality of segments;

maintaining an index table wherein each entry maps a fingerprint to a region of a plurality of regions, and a container identifier;

maintaining, in the fingerprint, a first bit indicating a liveness status of a corresponding segment, the first bit set to a live binary value or a dead binary value, and a second bit indicating a deduplication decision of the corresponding segment;

first determining, after in index lookup to the index table, that a percentage of live segments in the region is greater than a defined liveness threshold;

allowing a programmed deduplication operation to be performed to prevent duplicate data segments being stored and setting the first bit to a live state the live binary value;

second determining that a number of segments in the region subject to the deduplication operation is less than a defined deduplication threshold; and overriding the allowing step to prevent the deduplication operation being performed to thereby allow the duplicate segments to be stored and setting the second bit to a no deduplication state performing a garbage collection process of a file system to map each data segment fingerprint to a unique bit position in a perfect hash vector (PHV), wherein each bit represents a segment liveness, wherein liveness comprises a referencing of the segment by any current content of the file system;

converting the PHV to a region-based vector using region identifiers for each region of a plurality of regions, and container identifiers of the segments as keys;

defining two bits per segment in the region-based vector, wherein a first bit is set to a binary live or dead value, and a second bit indicating a deduplication decision of the segment;

grouping ingested data into one or more regions of the plurality of regions based on the container identifier and region identifier;

first calculating a liveness of each region to classify a corresponding region as live versus dead by determining that a percentage of live segments in the corresponding region is greater than a defined liveness threshold;

allowing a programmed deduplication operation to be performed to prevent duplicate data segments being stored, and setting the first bit to the live binary value;

second calculating a number of deduplicated segments of each region to determine that a number of segments in the corresponding region subject to the deduplication operation is less than a defined deduplication threshold; and overriding the allowing step to prevent the deduplication operation being performed to thereby allow duplicate data segments to be stored, and setting the second bit to a no deduplication state.

7. The computer program product of claim 6 wherein the first calculating step comprises:

tallying a number of live segments and a number of dead segments in the corresponding region based on the fingerprint marking;

subtracting the number of dead segments from the number of live segments to obtain a difference that determines the percentage of live segments;

defining the corresponding region as dead if the difference is less than the defined liveness threshold; and defining the corresponding region as sufficiently live if the difference is greater than or equal to the defined liveness threshold.

8. A system for performing deduplicated backups in a computer network comprising:

a processor comprising a garbage collection component of a file system mapping each data segment fingerprint to a unique bit position in a perfect hash vector (PHV), wherein each bit represents a segment liveness, wherein liveness comprises a referencing of the segment by any current content of the file system; and a garbage collection assistance component of the processor:

converting the PHV to a region-based vector using region identifiers for each region of a plurality of regions, and container identifiers of the segments as keys;

defining two bits per segment in the region-based vector, wherein a first bit is set to a binary live or dead value, and a second bit indicating a deduplication decision of the segment;

grouping ingested data into one or more regions of the plurality of regions based on the container identifier and region identifier;

first calculating a liveness of each region to classify a corresponding region as live versus dead by determining that a percentage of live segments in the corresponding region is greater than a defined liveness threshold;

allowing a programmed deduplication operation to be performed to prevent duplicate data segments being stored, and setting the first bit to the live binary value;

second calculating a number of deduplicated segments of each region to determine that a number of segments in the corresponding region subject to the deduplication operation is less than a defined deduplication threshold; and overriding the allowing step to prevent the deduplication operation being performed to thereby allow duplicate data segments to be stored, and setting the second bit to a no deduplication state.

9. The system of claim 8 wherein the first calculating comprises:

tallying a number of live segments and a number of dead segments in the corresponding region based on the fingerprint marking;

subtracting the number of dead segments from the number of live segments to obtain a difference that determines the percentage of live segments;

defining the corresponding region as dead if the difference is less than the defined liveness threshold; and defining the corresponding region as sufficiently live if the difference is greater than or equal to the defined liveness threshold.

10. The system of claim 8 wherein the garbage collection assistance component further maintains the PHV between the garbage collection process and a subsequent garbage collection process to represent region liveness of the computer network.

11. The system of claim 8 wherein the computer network comprises at least part of a deduplication backup system including a data storage server running a Data Domain file system (DDFS).

12. The system of claim 11 wherein the file system implements a log structured file system in which data and metadata are written sequentially to a log that is implemented as a circular buffer.

* * * * *